United States Patent
Steinbuch et al.

(10) Patent No.: US 10,768,277 B2
(45) Date of Patent: Sep. 8, 2020

(54) RADAR SENSOR FOR DRIVER ASSISTANCE SYSTEMS IN MOTOR VEHICLES

(71) Applicant: Robert Bosch GmbH, Stuttgart (DE)

(72) Inventors: Dirk Steinbuch, Wimsheim (DE); Karin Moertlbauer, Weil der Stadt (DE); Matthias Steinhauer, Steinheim (DE); Michael Ott, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 16/076,542

(22) PCT Filed: Dec. 29, 2016

(86) PCT No.: PCT/EP2016/082805
§ 371 (c)(1),
(2) Date: Aug. 8, 2018

(87) PCT Pub. No.: WO2017/137136
PCT Pub. Date: Aug. 17, 2017

(65) Prior Publication Data
US 2019/0041495 A1    Feb. 7, 2019

(30) Foreign Application Priority Data
Feb. 12, 2016 (DE) .......................... 10 2016 202 112

(51) Int. Cl.
*G01S 7/40* (2006.01)
*G01S 13/34* (2006.01)
(Continued)

(52) U.S. Cl.
CPC .................. *G01S 7/40* (2013.01); *G01S 7/35* (2013.01); *G01S 7/4008* (2013.01);
(Continued)

(58) Field of Classification Search
CPC combination set(s) only.
See application file for complete search history.

(56) References Cited

U.S. PATENT DOCUMENTS

| 5,528,245 A | 6/1996 | Aker et al. |
| 2005/0275585 A1 | 12/2005 | Shima et al. |

(Continued)

FOREIGN PATENT DOCUMENTS

| DE | 19729095 A1 | 2/1999 |
| DE | 19945250 A1 | 4/2001 |

(Continued)

OTHER PUBLICATIONS

International Search Report dated Apr. 12, 2017 of the corresponding International Application PCT/EP2016/082805 filed Dec. 29, 2016.

*Primary Examiner* — Mamadou L Diallo
(74) *Attorney, Agent, or Firm* — Norton Rose Fulbright US LLP; Gerard Messina

(57) ABSTRACT

A radar sensor for driver assistance systems in motor vehicles includes a transmitting and receiving device for transmitting and receiving radar signals, an electronic evaluation device for evaluating the received signals, an electronic control device for controlling the operating functions of the radar sensor, and a self-monitoring device for detecting operating parameters of the radar sensor and for comparing the detected parameters to specific setpoint values, where a control device modifies at least one of the operating parameters and a control circuit controls the parameter to the setpoint value thereof.

7 Claims, 3 Drawing Sheets

(51) Int. Cl.
  *G01S 13/931*  (2020.01)
  *G01S 7/35*  (2006.01)
  *G01S 13/02*  (2006.01)

(52) U.S. Cl.
  CPC .......... *G01S 7/4017* (2013.01); *G01S 7/4021* (2013.01); *G01S 7/4026* (2013.01); *G01S 7/4056* (2013.01); *G01S 13/343* (2013.01); *G01S 13/931* (2013.01); *G01S 2007/403* (2013.01); *G01S 2007/4013* (2013.01); *G01S 2007/4069* (2013.01); *G01S 2013/0245* (2013.01)

(56) References Cited

U.S. PATENT DOCUMENTS

| | | | |
|---|---|---|---|
| 2006/0227040 A1 | 10/2006 | Christian et al. | |
| 2007/0139261 A1 | 6/2007 | Vacanti | |
| 2009/0140913 A1* | 6/2009 | Hildebrandt | G01S 13/931 342/70 |
| 2011/0044507 A1* | 2/2011 | Strauss | G01S 13/867 382/103 |
| 2012/0049860 A1* | 3/2012 | Heilmann | G01S 7/412 324/629 |
| 2012/0169525 A1* | 7/2012 | Klar | G01S 7/4004 342/70 |
| 2014/0104097 A1* | 4/2014 | Binzer | G01S 13/02 342/74 |
| 2014/0288785 A1* | 9/2014 | Bretzigheimer | B60T 8/17558 701/48 |
| 2014/0347208 A1* | 11/2014 | Schoor | G01S 13/931 342/133 |
| 2015/0057835 A1* | 2/2015 | Streubel | B60W 30/09 701/1 |
| 2015/0276919 A1* | 10/2015 | Matsumura | H01Q 1/3233 342/175 |
| 2015/0301172 A1* | 10/2015 | Ossowska | G01S 13/878 342/70 |
| 2016/0001781 A1* | 1/2016 | Fung | G16H 50/20 701/36 |
| 2017/0113664 A1* | 4/2017 | Nix | B60T 8/17558 |
| 2017/0285165 A1* | 10/2017 | Khlifi | G01S 13/86 |
| 2018/0321377 A1* | 11/2018 | Sudhakar | G06K 9/00805 |
| 2018/0321378 A1* | 11/2018 | Sudhakar | G01S 7/4026 |

FOREIGN PATENT DOCUMENTS

| | | |
|---|---|---|
| JP | H0331783 A | 2/1991 |
| JP | 2004294223 A | 10/2004 |

\* cited by examiner

RADAR SENSOR FOR DRIVER ASSISTANCE SYSTEMS IN MOTOR VEHICLES

CROSS-REFERENCE TO RELATED APPLICATIONS

The present application is the national stage of International Pat. App. No. PCT/EP2016/082805 filed Dec. 29, 2016, and claims priority under 35 U.S.C. § 119 to DE 10 2016 202 112.5, filed in the Federal Republic of Germany on Feb. 12, 2016, the content of each of which are incorporated herein by reference in their entireties.

FIELD OF THE INVENTION

The present invention relates to a radar sensor for driver assistance systems in motor vehicles, having a transmitting and receiving device for transmitting and receiving radar signals, an electronic evaluation device for evaluating the received signals, an electronic control device for controlling the operating functions of the radar sensor, and a self-monitoring device for detecting operating parameters of the radar sensor and for comparing the detected parameters to specific setpoint values.

BACKGROUND

In driver assistance systems for motor vehicles, for example, in ranging systems or collision warning systems, radar systems are used for sensing the surrounding field of traffic, in particular for locating the position of other traffic participants. Due to safety considerations, such radar sensors must be continually checked to ensure that the sensor is actually operational and, accordingly, whether the assistance function supported by the radar sensor is actually available and performing reliably. For this purpose, the self-monitoring device monitors various important operating parameters of the radar sensor.

The German Patent Application DE 199 45 250 A1 describes a radar sensor of this type where the self-monitoring device is used for recognizing a blinding of the radar sensor.

It has also been discussed to monitor other operating parameters, for example, the amplitudes or power levels of the transmitted radar signals, amplitude differences and phase differences among the signals in various transmit and receive channels, and the like. When the detected deviation between the setpoint and actual values for one of these parameters is outside of a permissible tolerance range, a self-deactivation of the radar sensor results, and a dashboard warning is issued to the motor vehicle driver indicating that the assistance function in question is not available.

Since driver assistance systems for motor vehicles are generally safety-related systems, only narrow tolerance limits are permissible for the important operating parameters of the radar sensor to ensure a proper operation thereof in all circumstances. However, the narrower the tolerance limits are, the more frequent are situations where an error signal is communicated to the driver. This can limit the acceptance of the driver assistance system.

SUMMARY

An object of the present invention is to provide a radar sensor that will be more readily available without limiting functional reliability. This objective is achieved in accordance with the present invention by a control device for modifying at least one of the operating parameters and a control circuit for controlling this parameter to the setpoint value thereof.

When one of the monitored operating parameters drifts and increasingly deviates from the setpoint value thereof due, for example, to temperature influences, aging effects, component defects, or the like, then the control circuit and the associated control device make it possible to reset this parameter to the setpoint value thereof before it leaves the permissible tolerance range. The function of the radar sensor is thereby retained at least until the operating range of the control device is exhausted. This makes it possible to considerably enhance the availability of the radar sensor without setpoint/actual-value deviations of the parameters increasing the risk of a malfunction.

In an example embodiment, one of the monitored operating parameters is the amplitude or power of the transmitted radar signal. Here, the control device is a controllable amplifier that is used to control the amplitude or power to the setpoint value.

Radar sensors for motor vehicles typically have a plurality of transmit channels via which a plurality of transmitting antennae are fed. A certain beam forming can thereby be realized. In the case of an angularly resolving radar sensor, a plurality of receiving antennae and, accordingly, a plurality of receive channels are provided, so that the angle of the tracked object can be estimated by comparing the amplitudes and/or phases of the signals received in the various channels. In these cases, the monitored operating parameters can also include the amplitude and/or phase relationships among the various transmit channels. It is likewise possible to feed test signals having fixed amplitude and/or phase relationships into the receive channels. The monitored operating parameters can then also include the amplitude and/or phase relationships that are measured in the various receive channels for the test signals. In these cases, controllable amplifiers can be provided as control devices for the amplitude relationships, and controllable phase shifters as control devices for the phase relationships.

Since the operation of the transmit and receive device unavoidably entails a certain power loss that leads to a warming of the radar sensor, the temperature of the radar sensor is also an essential operating parameter that requires monitoring. A module in the control device can serve as a control device that prevents the radar sensor from overheating and modifies the repetition rate of the successive measurement cycles, thereby resulting, between the individual measurement cycles, in longer or shorter intervals during which the radar sensor is able to cool. Reducing the frequency of the measurement cycles limits the time resolution of the radar tracking, but, in terms of safety considerations, this is less harmful than the radar sensor completely failing due to overheating.

Exemplary embodiments are described in greater detail below with reference to the drawings.

DETAILED DESCRIPTION

Figure 1:
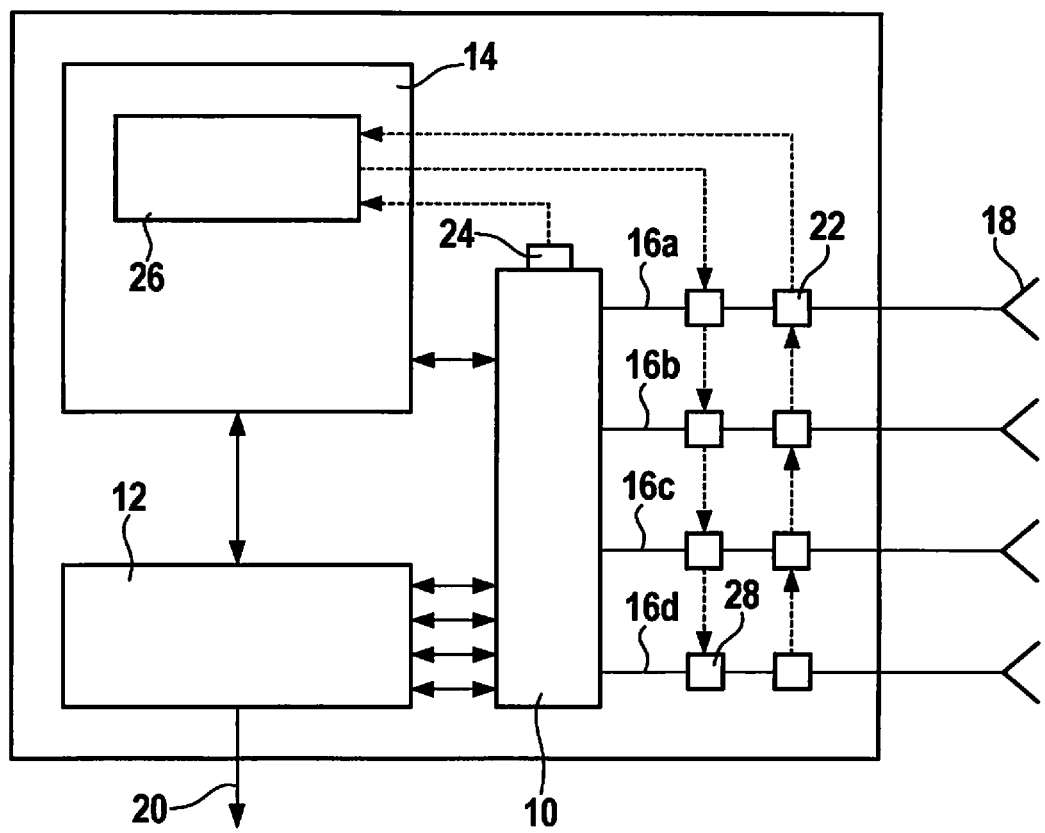
FIG. 1 is a block diagram of a radar sensor according to an example embodiment of the present invention.

The radar sensor shown in FIG. 1 has a transmit and receive device 10, an evaluation device 12, and a control device 14 that controls various process sequences in transmit and receive device 10 and in evaluation device 12.

A purpose of transmit and receive device 10 is to transmit and receive radar signals on four parallel transmit and receive channels 16a-16d. Each channel has an assigned antenna 18 that is used both for transmitting the radar signal and for receiving the radar echo.

It is assumed exemplarily that the radar sensor described here is what is referred to as a FMCW radar (frequency modulated continuous wave). Transmit and receive device 10 then feeds a radar signal, whose frequency is ramp modulated, into each of transmit and receive channels 16a-16d, so that the signal is made up of a series of successive linear frequency ramps. The received radar echo is then mixed in each channel with a component of the corresponding transmit signal. A baseband signal is then obtained as a mixed product. Its frequency corresponds to the frequency differential between the transmitted signal and the received signal. This frequency differential is then dependent, on the one hand, on the ramp slope and on the signal propagation time from the radar sensor to the object and back to the radar sensor and thus contains information about the distance of the tracked object. On the other hand, however, due to the Doppler effect, the frequency differential is also dependent on the relative velocity of the object.

The baseband signals received in the four channels are digitized and further evaluated in digital evaluation device 12. Specifically, the signal is recorded in each channel over the duration of a frequency ramp and converted into a spectrum by a Fast Fourier Transform (FFT) process. A tracked object is apparent in this spectrum as a peak in the frequency that is determined by the distance and relative velocity of the object. By evaluating the at least two frequency ramps having different slopes, the distance and the relative velocity of the object can be uniquely determined from the frequency positions of the peaks obtained on the two ramps.

By comparing the amplitudes and phases of the signals that are received in the four different channels, information on the azimuth angle of the object can also be obtained, thus information on the direction from which the radar radiation reflected off of the object is received.

Thus, at an output 20, evaluation device 12 can provide information about the tracking data (distances, relative velocities, and azimuth angle) of the tracked objects to a downstream driver assistance system.

A proper functioning of the radar sensor requires that the amplitudes of the radar signals transmitted in the individual channels not deviate too much from a specified setpoint value. Equivalent thereto is the requirement that the radar signal power (that is proportional to the amplitude square) correspond within certain tolerance limits to a specified setpoint power.

Moreover, known amplitude and phase relationships must exist among the signals that are transmitted in the various channels. In the simplest case, all of the signals have the same amplitude and the same phase. Significant amplitude and/or phase differences among two or more of the four channels would lead to falsifications of the measuring result, in particular in the determination of the azimuth angle.

The absolute amplitude of the transmitted signals, and the amplitude differences and phase differences from channel to channel, therefore, constitute important operating parameters of the radar sensor that are to be observed within certain tolerance limits. To monitor these and other operating parameters, the radar sensor has a self-monitoring device that is made up of various detection systems 22, 24 and of a self-monitoring module 26 implemented in control device 14. In the illustrated example, each of the four transmit and receive channels 16a-16d has a detection system 22 specific thereto. Detection system 24 is used for measuring the temperature of the radar sensor, in particular the temperature of transmit and receive device 10 during whose operation, waste heat is generated. Self-monitoring module 26 receives measurement signals from detection systems 22, 24, compares these to the respective setpoint values and associated tolerance limits and, as is known per se, initiates the outputting of a warning signal in response to an operating parameter being outside of the tolerance range. In the case of the radar sensor shown here, however, self-monitoring module 26 is adapted to output control commands to various control devices 28 to modify the relevant operating parameters. Thus, detection systems 22, 24, self-monitoring module 26, and control devices 28 form a control circuit that can be used to control the relevant operating parameters to the respective setpoint values thereof.

Figure 2:
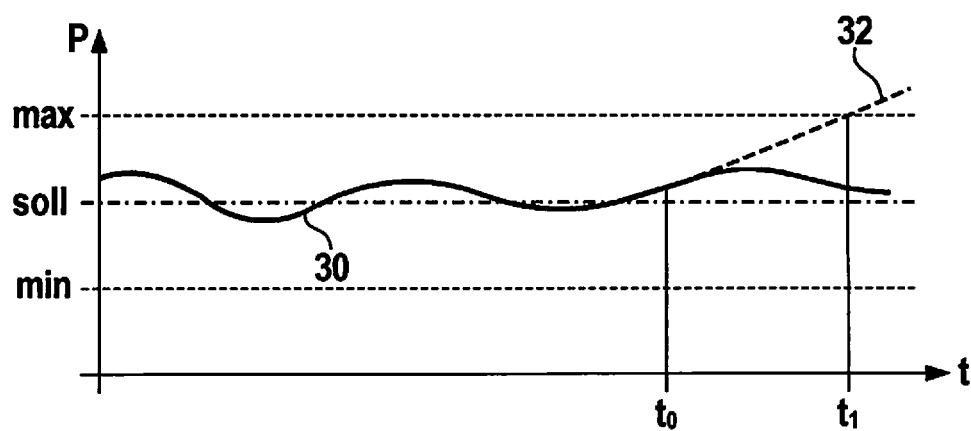
FIG. 2 is a time diagram illustrating a self-monitoring and correction function of the radar sensor, according to an example embodiment of the present invention.

The basic principle is illustrated in FIG. 2. There, a curve 30 indicates the measured values obtained for an individual operating parameter P as function of time t. A broken line marks the setpoint value "setpoint," that is to be observed for this parameter P, and thinner dashed lines identify a tolerance range having a lower limit "min" and an upper limit "max." During error-free operation of the radar sensor, the measured value indicated by curve 30 fluctuates within a small fluctuation range about the setpoint value. However, in the illustrated example, a disturbance occurs at point in time to which, without any countermeasure, would lead to the parameter drifting further away from the setpoint value and leaving the tolerance range at point in time $t_1$, as indicated in FIG. 2 by a dashed line 32. However, as soon as the measured value for parameter P deviates by a specific amount from the setpoint value, self-monitoring device 26 activates associated control device 28, which again induces resetting of the parameter to the setpoint value, as indicated by curve 30.

Figure 3:
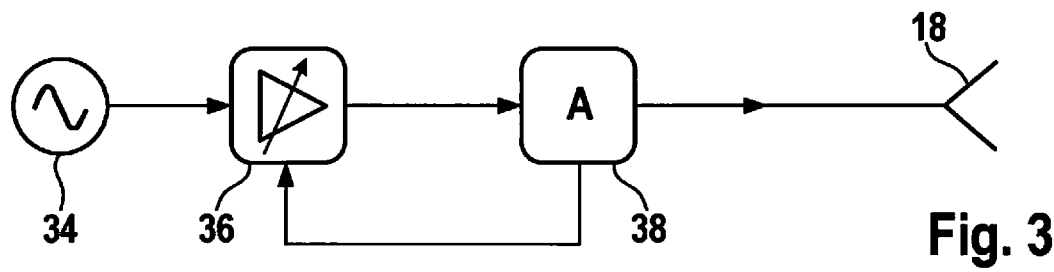
FIG. 3 is a diagram of a transmit channel of the radar sensor having a control circuit for controlling the signal amplitude, according to an example embodiment of the present invention.

FIG. 3 shows a single transmit channel, thus the transmission path of one of transmit and receive channels 16a-16d. An oscillator 34 generates a frequency-modulated transmission signal that is transmitted via an amplifier 36 and a power-measuring circuit 38 to antenna 18. Amplifier 36 is part of control device 28 shown in FIG. 1. Power-measuring circuit 38 is part of detection device 22 and measures the power and thus, implicitly, amplitude A of the transmission signal, and feeds the measuring result back (via self-monitoring module 26) to amplifier 36. In response to the amplitude of the transmission signal being below the setpoint value, the amplification is increased in amplifier 36, and the amplification is reduced when the amplitude rises above the setpoint value. Amplitude A of the transmission signal is thereby continuously controlled to the setpoint value during the course of operation.

Figure 4:
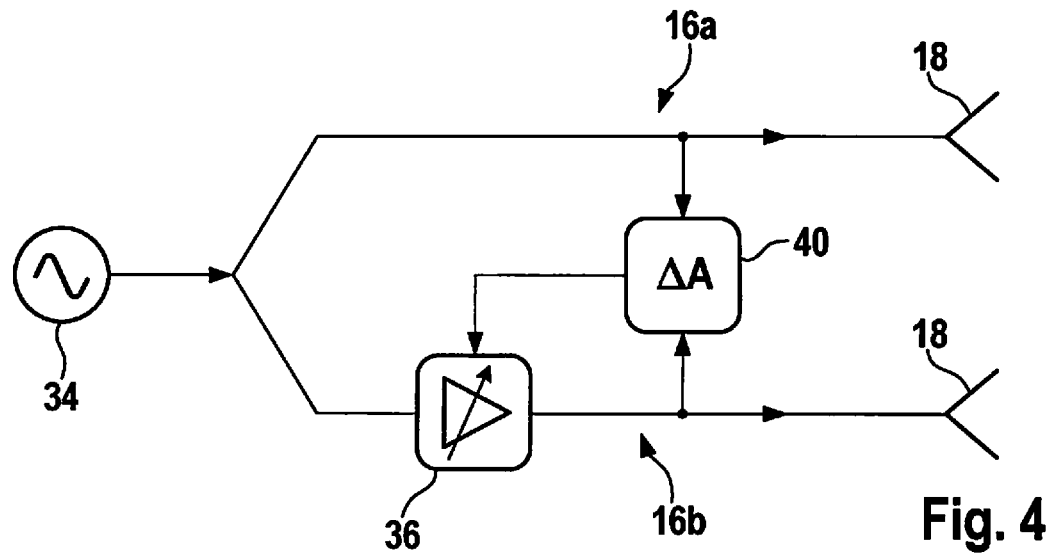
FIG. 4 is a diagram of two transmit channels including a control circuit for controlling an amplitude relationship between the two channels, according to an example embodiment of the present invention.

FIG. 4 schematically shows two transmit channels, which can be the transmission paths of transmit and receive channels 16a and 16b, for example. Both transmission paths are fed from oscillator 34. However, in another example embodiment, separate oscillators can also be provided for each transmit channel.

A power-measuring circuit 40 is connected between associated antennae 18 and implicitly measures amplitude AA of the difference signal between the two transmission signals. The measuring result is fed back to amplifier 36 of at least one of the two transmit channels. This amplifier is then controlled in such a way that amplitude AA of the difference signal is controlled to the setpoint value zero.

Circuits of the type shown in FIG. 4 can also be provided for other pairings of the four transmit and receive channels 16a-16d, making it possible for the amplitudes of all four transmission signals to be equalized and controlled to the same setpoint value. This can be accomplished, for example, by transmit and receive channels 16a functioning as a master by controlling the amplitude to the setpoint value, while the three remaining transmit and receive channels function as slaves, whose amplitude is adjusted to the amplitude of the master. Alternatively, it is also possible to measure and control amplitude AA of the difference signal between the pairs of transmit and receive channels 16a and 16b, 16b and 16c, and 16c and 16d.

Figure 5:
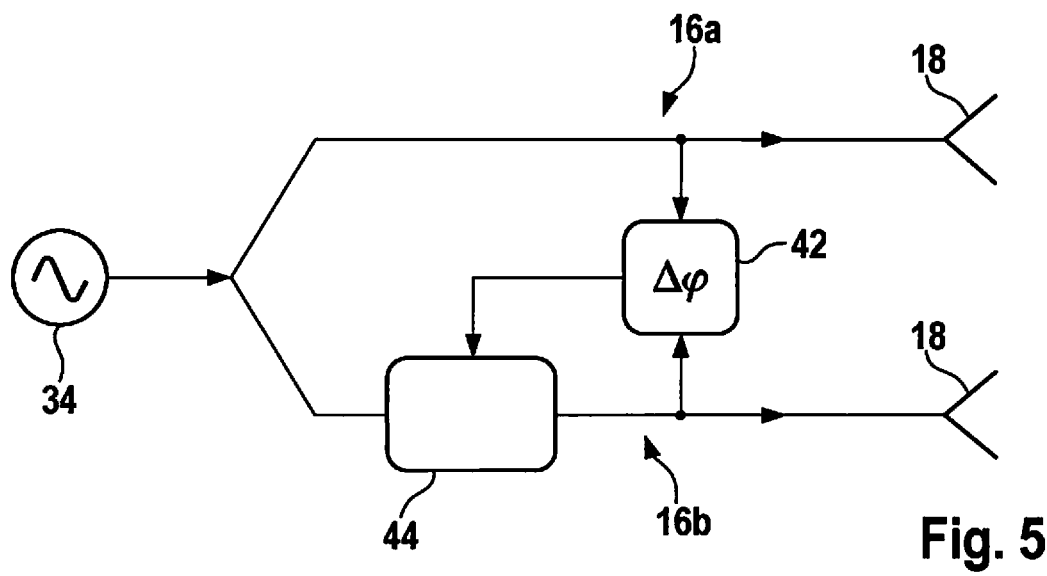
FIG. 5 is a diagram of two transmit channels including a control circuit for controlling a phase relationship between the two channels, according to an example embodiment of the present invention.

FIG. 5 shows another part of detection device 22 and of control device 28 for transmit and receive channels 16a and 16b. In this part of the circuit, phase difference Δφ between the transmission signals is measured by a phase measurement circuit 42 connected between antennae 18. The measuring result is fed back to a phase shifter 44 in at least one of the channels, so that phase difference Δφ is controlled to a setpoint value, for example, to a setpoint value zero, in a closed-loop control circuit. For the channel pairings that are provided for the circuits in accordance with FIG. 5 and for the master/slave relationships, the same holds as in FIG. 4.

Figure 6:
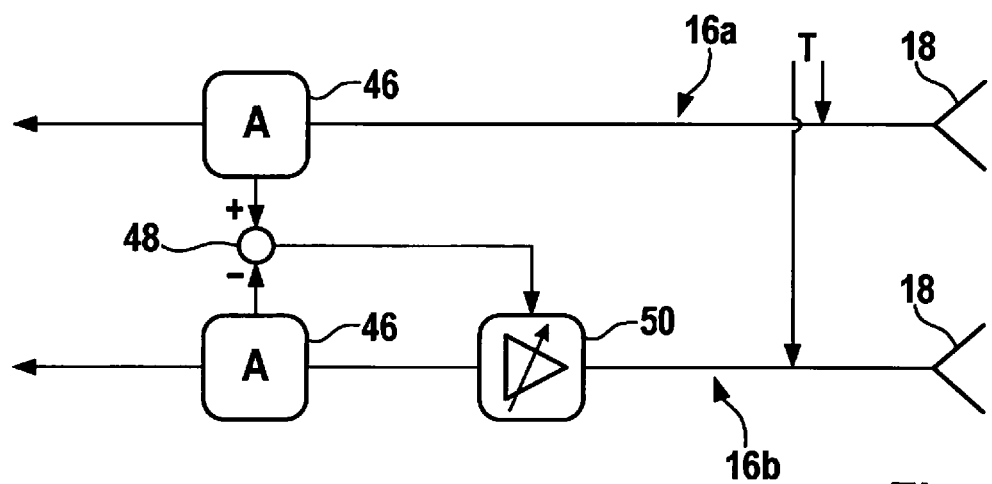
FIG. 6 is a diagram of two receive channels of the radar sensor including a control circuit for controlling an amplitude relationship between the receive channels, according to an example embodiment of the present invention.

The amplitudes and phases of the received signals are measured in the receive paths of the transmit and receive channels. The associated measuring circuits, which can be partly implemented in transmit and receive device 10, and partly also in evaluation device 12, should be calibrated to also measure the same amplitudes and the same phases in response to the supplying of identical signals in all of the channels. FIG. 6 shows a circuit for a pair of the transmit and receive channels, for example, 16a, 16b, where the calibration of the amplitude measurement is checked during the course of operation and corrected if necessary. To that end, self-monitoring module 26 applies a test signal T to the outputs of the two antennae 18. Amplitude measuring circuits 46 measure the receiving amplitude in each channel, and a subtraction element 48 feeds back the amplitude difference to a receiving amplifier 50 in at least one of the channels. The amplitude difference measured for test signal T is thereby controlled to the setpoint value zero.

Figure 7:
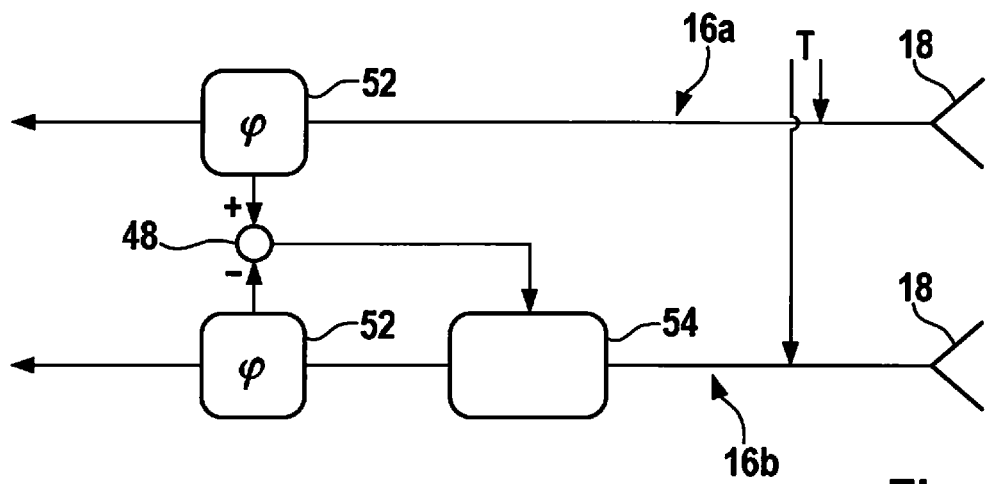
FIG. 7 is a diagram of two receive channels including a control circuit for controlling a phase relationship between the two channels, according to an example embodiment of the present invention.

FIG. 7 shows a corresponding circuit for checking and correcting the phase calibration. Instead of amplitude measuring circuits 46 in FIG. 6, phase measurement circuits 52 are provided here, and, instead of receiving amplifier 50, a phase shifter 54 is provided.

By using circuits of the type shown in FIGS. 6 and 7, it is possible to continuously calibrate the receive amplitudes and the receive phases in all channels.

In the illustrated example, the same test signal T is fed in each instance to all receive channels. However, it is also possible to feed various signals to the receive channels, for example, signals that simulate the reception signals of antennae 18 that were received in a test system using a real object prior to initial operation of the radar sensor.

Another important operating parameter of the radar sensor is the temperature of transmit and receive device 10 that is measured using detection device 24. However, an exceptional feature here is that it is not a question of observing a specific setpoint temperature, rather merely of preventing an overheating of the radar sensor, and thus an exceedance of a specific maximum temperature. This can be accomplished using a control device, for example, that reduces the heat generated in transmit and receive device 10 to the point where the amount of heat dissipated via customary heat sinks exceeds the quantity of the newly generated heat.

Figure 8:
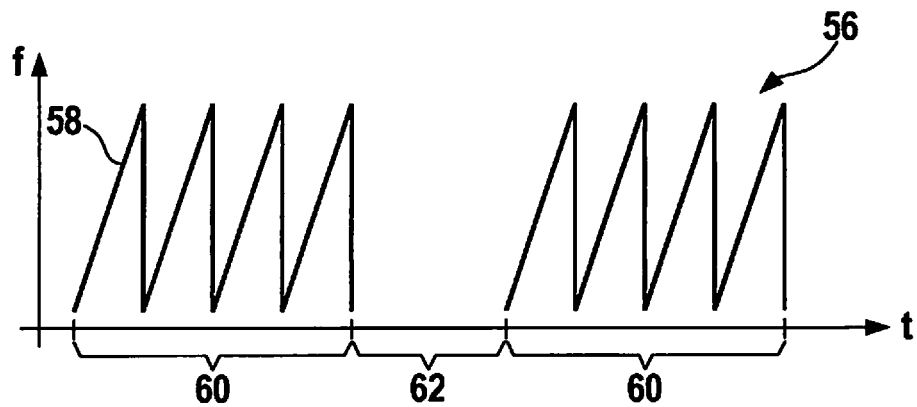
FIG. 8 is a time diagram for illustrating a time sequence of various measurement cycles of the radar sensor, according to an example embodiment of the present invention.

FIG. 8 shows a frequency diagram for a transmission signal that is transmitted in one of the transmit and receive channels or in all four channels. Here, a sawtooth curve 56 indicates frequency f of the transmission signal as function of time t. In the illustrated example, frequency f is modulated in such a way that successive frequency ramps 58 are formed with the same slope. In practice, frequency ramps are usually formed with different slopes that alternate with each other in accordance with a certain pattern. However, this is not essential to the present invention described here.

In the case of a conventional FMCW radar, frequency ramps 58 form a sequence without gaps, i.e., the transmission signal is continuously transmitted. However, in the case of the radar sensor described here, the transmission signal is divided into individual bursts 60 of a plurality of frequency ramps, respectively, and bursts 60 are interrupted by intervals 62 during which no signal is transmitted and, accordingly, no dissipation heat is produced either. The control device for limiting the temperature is provided by a function of self-monitoring module 26 that varies the length of intervals 62 among individual bursts 60 as a function of the measured temperature.

What is claimed is:

1. A radar sensor for driver assistance systems in motor vehicles, comprising:
   a transmitting and receiving device configured to transmit and receive radar signals;
   an electronic evaluation device configured to evaluate the received radar signals;
   an electronic control device configured to control operating functions of the radar sensor;
   a self-monitoring device configured to detect operating parameters of the radar sensor, and to compare the detected parameters to respective setpoint values;
   a control device including a control circuit configured to, based on a result of the comparison, control at least one of the operating parameters to approach the respective setpoint value thereof; and
   a plurality of receive channels, wherein the self-monitoring device is configured to feed a test signal to the receive channels, and one of the controlled operating parameters is an amplitude calibration of the receive channels.

2. The radar sensor of claim 1, wherein one of the controlled operating parameters is an amplitude of a transmitted radar signal.

3. The radar sensor of claim 1, further comprising:
at least two transmit channels, wherein one of the controlled operating parameters is an amplitude difference of signals transmitted on the two transmit channels.

4. The radar sensor of claim 1, further comprising:
at least two transmit channels, wherein one of the controlled operating parameters is a phase difference of signals transmitted on the two transmit channels.

5. The radar sensor of claim 1, wherein the self-monitoring device includes a detection device configured to measure a temperature of the radar sensor, and wherein one of the controlled operating parameters is the temperature of the radar sensor.

6. A radar sensor for driver assistance systems in motor vehicles, comprising:
a transmitting and receiving device configured to transmit and receive radar signals;
an electronic evaluation device configured to evaluate the received radar signals;
an electronic control device configured to control operating functions of the radar sensor;
a self-monitoring device configured to detect operating parameters of the radar sensor, and to compare the detected parameters to respective setpoint values;
a control device including a control circuit configured to, based on a result of the comparison, control at least one of the operating parameters to approach the respective setpoint value thereof; and
a plurality of receive channels, wherein the self-monitoring device is configured to feed a test signal to the receive channels, and wherein one of the controlled operating parameters is a phase calibration of the receive channels.

7. A radar sensor for driver assistance systems in motor vehicles, comprising:
a transmitting and receiving device configured to transmit and receive radar signals;
an electronic evaluation device configured to evaluate the received radar signals;
an electronic control device configured to control operating functions of the radar sensor;
a self-monitoring device configured to detect operating parameters of the radar sensor, and to compare the detected parameters to respective setpoint values; and
a control device including a control circuit configured to, based on a result of the comparison, control at least one of the operating parameters to approach the respective setpoint value thereof;
wherein the self-monitoring device includes a detection device configured to measure a temperature of the radar sensor, wherein one of the controlled operating parameters is the temperature of the radar sensor, and
wherein the self-monitoring device is configured to control the transmitting and receiving device such that time periods during which radar signals are transmitted are interrupted by intervals during which no radar signals are transmitted and whose length is dependent on the measured temperature.

\* \* \* \* \*